(12) United States Patent
Knez et al.

(10) Patent No.: US 10,352,733 B2
(45) Date of Patent: Jul. 16, 2019

(54) PROCESS AND DEVICE FOR ACQUISITION OF DATA OF A COUNTING DEVICE MEASURING PULSES DELIVERED BY A SENSOR

(71) Applicant: DEWESoft, Trbovlje (SI)

(72) Inventors: Jure Knez, Trbovlje (SI); Tilen Sotler, Trbovlje (SI)

(73) Assignee: DEWESOFT, Trbovlje (SI)

( * ) Notice: Subject to any disclaimer, the term of this patent is extended or adjusted under 35 U.S.C. 154(b) by 702 days.

(21) Appl. No.: 14/870,995

(22) Filed: Sep. 30, 2015

(65) Prior Publication Data

US 2017/0074684 A1    Mar. 16, 2017

(30) Foreign Application Priority Data

Sep. 10, 2015    (EP) .................................... 15184725

(51) Int. Cl.
| | | |
|---|---|---|
| *G04F 1/00* | (2006.01) | |
| *G01D 5/248* | (2006.01) | |
| *G01D 5/347* | (2006.01) | |
| *G01D 5/36* | (2006.01) | |

(52) U.S. Cl.
CPC ......... *G01D 5/248* (2013.01); *G01D 5/34715* (2013.01); *G01D 5/36* (2013.01)

(58) Field of Classification Search
CPC ....... G01D 5/248; G01D 5/34715; G01D 5/36
USPC ........ 702/178; 713/400, 401, 500, 501, 502, 713/503
See application file for complete search history.

(56) References Cited

U.S. PATENT DOCUMENTS

| | | | |
|---|---|---|---|
| 6,263,036 B1 | 7/2001 | Yamamoto et al. | |
| 7,330,138 B2 | 2/2008 | Mallinson et al. | |
| 8,176,351 B2 * | 5/2012 | Castro ............ | G01R 31/318357 327/156 |
| 8,762,097 B2 * | 6/2014 | Millet ..................... | G06F 1/206 374/100 |
| 2012/0072169 A1 | 3/2012 | Gribble | |
| 2015/0144774 A1 | 5/2015 | Fritsch | |

FOREIGN PATENT DOCUMENTS

| | | |
|---|---|---|
| EP | 0303711 A1 | 8/1988 |
| EP | 0414953 A1 | 3/1991 |

OTHER PUBLICATIONS

Search report issued by European Patent Office, dated Feb. 16, 2016, for corresponding European Patent Application 15184725.8-1568.

* cited by examiner

*Primary Examiner* — Vu A Le
(74) *Attorney, Agent, or Firm* — Black, McCuskey, Souers & Arbaugh, LPA (57) ABSTRACT

A process for the acquisition of data of a counting device measuring pulses delivered by a sensor can include reading a first datum value of the counting device. The first datum value corresponds to the pulse emitted by the sensor. The process can also include storing in memory the first datum value as a source value. The process can also include measuring a time-interval between said reading and an incremental change of the first datum value of the counting device to a second datum value. The process can also include obtaining a first adjustment value Vx in response to the measured time interval.

10 Claims, 5 Drawing Sheets

Fig 5

PROCESS AND DEVICE FOR ACQUISITION OF DATA OF A COUNTING DEVICE MEASURING PULSES DELIVERED BY A SENSOR

BACKGROUND

1. Field

The present disclosure concerns a process for acquisition of data of a counting device measuring pulses delivered by a sensor, and extends to a device designed for the implementation of such a process.

2. Description of Related Prior Art

Counting devices associated with sensors delivering a train of pulses can be used to obtain information on a mobile unit such as the position of the mobile unit and/or its speed and/or its acceleration by measuring the number of pulses that are output by the sensor and/or it can also be used to count the number of pulses delivered by the sensors. A sensor delivering a train of pulses can be an optical sensor, an inductive sensor, a Hall sensor etc. For example, a rotary encoder is a device including a graduated mobile disc exhibiting a certain resolution and coupled to a rotating shaft. In this case the graduations of the disc can be read by means of an optical transmission module and an optical reception module, said modules being fixed on either side of the disc. The rotation of the disc then generates zones of shadow or of light on the receiver. These two states of the receiver—shaded or illuminated—can be converted into a train of pulses. The rotary encoder increments a counter upon each pulse detected, in order to output an item of angle information. Other types of counting devices can also be used for linear encoders and angular encoders for toothed wheels. A linear encoder measures the displacement of a body in a rectilinear direction. The angular encoder for toothed wheels also enables an item of angle information to be output by counting the number of teeth and of spaces of the toothed wheel that have been detected by the sensor of the encoder, in order to know the rotation executed about a shaft.

An item of speed information of a mobile unit can be deduced by measuring the frequency of the various changes of state of the sensor of the encoder.

A process for acquisition of data of a counting device consists in sampling the data of a counting device according to a required frequency, and in carrying out, if need be, a subsequent processing of these data. The data of the counting device that have been acquired in this way are digital values, named values of the counting device.

U.S. Pat. No. 8,176,351 describes a sampling process for counting devices for data acquisition. At least one counter enables the number of pulses of the train of pulses that are output by the sensor to be counted, and is able to record these values in a memory. The values acquired by the counter may represent indications of position of a mobile unit if the input signal stems from a sensor of a rotary encoder, for example.

This acquisition process has several drawbacks. On account of the fact that the train of pulses emitted by the sensor indicates a state in which the sensor is to be found (for example, shaded or illuminated), only the edges of the pulses, representing a change of state, designate an exact position. In consequence, to obtain precise measurements it is necessary to use a high-frequency sampling clock to detect these changes of state and, consequently, a change of value of the counting device. Now, the use of a high-frequency sampling clock is costly, because it involves a high CPU load and recording a large amount of data.

In order to lessen this cost, it is possible to reduce the sampling frequency. But this solution leads to a lag in relation to the change of value of the counting device. The acquired data are therefore not synchronized with the counting device.

Since the train of pulses produces a temporal discretisation, a pulse being representative only of a time-interval in the course of which the sensor is maintained in one state (shaded or illuminated, for example), it may also be useful to estimate the exact positioning of the mobile unit. To do this, a step of adjustment of the values of the counting device that have been read may be provided. In this way, successive repeated values of the counting device that are due to the absence of a change of state are adjusted by linear interpolation, using the read value that is representative of the change of state of the sensor preceding the value having to be adjusted and the read value that is representative of the change of state of the sensor following the value having to be adjusted. However, this calculation may be based on read values that themselves have been falsified by the sampling frequency. In consequence, the results of this approximation are not representative of the instantaneous real positioning of the mobile unit.

SUMMARY

The present disclosure aims to palliate these drawbacks.

One or more embodiments of the present disclosure therefore aim to obtain values, at any instant, that are representative of the position of a mobile unit on the basis of a counting device measuring pulses delivered by a sensor according to the position of the mobile unit.

One or more embodiments of the present disclosure also aim to reduce the CPU load, which can then be used for other tasks, and to reduce the size of data storage relating to the measurements of position.

One or more embodiments of the present disclosure therefore concern a process for acquisition of data of a counting device measuring pulses delivered by a sensor, including:

a step of reading, at an instant of reading, of a value, named source value, of a datum of the counting device, characterized in that said process includes:

a step of measurement of a time-interval, named measured time interval, between a sampling of a source value and a change of value of said datum of the counting device, a step of calculation of a value replacing the source value, named adjustment value, at least on the basis of the measured time-interval and the source value.

In this way, named adjustment value is calculated by taking into account the source value and the measured time-interval between the sampling and a change of value of the counting device, where the value of the counting device can increment or decrement. In the following, a change of value of the counting device will be named incrementation of the counting device. The sampling step of this process may be repeated at regular intervals, defining a sampling period and a sampling frequency. An adjustment value is then calculated in accordance with this process for each sampling of a source value that is representative of a change of value of the counting device, named first reading. The adjustment value is then stored, in order to be able to be analyzed subsequently. This process enables, on the one hand, adjustment values to be obtained according to a sampling frequency that is independent of the variations of the value of the counting device, but also enables the lack of precision of the counting device to be rectified. This process therefore enables results to be obtained that are representative of the instantaneous positioning of the mobile unit on the basis of a sampling frequency lower than the operating frequency of the counting device. In consequence, this brings about a higher precision, CPU gain and a lowering of the volume, and therefore of the cost of storage, of the data.

Advantageously and according to one or more embodiments of the present disclosure, the adjustment value calculated in the course of the calculation step is obtained by the formula:

$$V_x = (C'_{x-1} + 1) + [C'_x - C'_{x-1}] \times \frac{(N \times p - D_1)}{N \times p - D_1 + D_2}$$

where:

$V_x$ is the calculated adjustment value, a procurement of an adjustment value marking an end of calculation of this adjustment value by a data acquisition device, $C'_x$ is a source value of adjustment value $V_x$ and is the current or present sampling of the counting device by the data acquisition device, $D_2$ is the measured time-interval between the current sampling of the counting device by the data acquisition device and the change of increment of the counting device, $C'_{x-1}$ is a source value of adjustment value $V_x$ obtained by the data acquisition device and is sampled from the counting device at a first index value that precedes the current index value and is also representative of a change of value of the counting device, $D_1$ is the measured time-interval between the sampling of $C'_{x-1}$ and a next change of value of the counting device, x is an index associated with the samplings of the counting device by the data acquisition device, p is the period between two consecutive samplings of values of the counting device (the sampling frequency of the data acquisition device), N is the number of changes of value of the counting device between two consecutive samplings of values of the counting device by the data acquisition device.

More particularly, advantageously and according to one or more embodiments of the present disclosure, the process includes a step of linear interpolation of said adjustment values. If successive samplings of the counting device by the data acquisition device reveal no change in the increment of the counting device, the adjustment value can be determined by linear interpolation rather than calculated with the equation set forth above. This enables missing adjustment values to be determined by interpolation with the aid of the mathematical formula:

$$V_x = V_{x-i} + (i) \times \frac{V_{x+M} - V_{x-i}}{M + i}$$

where:

$V_x$ is a missing adjustment value at index value x to be determined by interpolation, $V_{x-i}$ is the most immediate preceding adjustment value that was calculated and not determined by interpolation, $V_{x+M}$ is the most immediate proceeding adjustment value that was calculated and not determined by interpolation, M is the number of samplings of the counting device by the data acquisition device between the current index value x and the sampling of the calculated adjustment value $V_{x+M}$ (M+i is the number of samplings of the counting device by the data acquisition device between adjustment values that were calculated and not determined by interpolation), x is an index associated with the samplings of the counting device by the data acquisition device, i is the number of samplings of the counting device by the data acquisition device between the current index value x and the calculated adjustment value $V_{x-i}$.

This step is implemented when no incrementation of the counting device—i.e. no change of state of the sensor—has taken place between at least two samplings of source values by the data acquisition device, respectively named first and second sampling. This step therefore enables the data acquisition device to determine adjustment values of a source value which is not representative of a change of value of the counting device. In fact, the calculation of an adjustment value according to the first three steps previously described necessitates the measurement of a time-interval between the sampling of the source value and the incrementation of the value of the counting device that follows this reading. In consequence, if no incrementation of the counting device has taken place between two samplings of source values, the measurement of the time-interval necessary for the calculation of the adjustment value of the source value that was read at the time of the first sampling will not be completed at the time of the second reading. In order to adjust the source values that are not representative of an incrementation of the counting device, it is then preferable to determine adjustment values of these source values, named missing adjustment values. These missing adjustment values are then determined on the basis of a linear interpolation of an adjustment value of a source value that is representative of an incrementation of the counting device and that was read at the time of the first sampling preceding the sampling of the source value of said missing adjustment value. The missing adjustment values are also calculated on the basis of the first adjustment value of a source value that is representative of an incrementation of the counting device and that was read at the time of the sampling following the sampling of said missing adjustment value.

More particularly, advantageously and according to the present disclosure, the process includes a step of calculation of a frequency of the changes of value of the counting device, named frequency of events, the calculation being realized on the basis of the measured time-intervals. This frequency of events enables the speed of displacement of the mobile unit. For example, in the case of a rotary encoder the calculated frequency of events provides information about the angular velocity of the mobile unit.

In particular, advantageously and according to the present disclosure, the process includes a step of allocation of an adjustment value to an instant of sampling of a source value of this adjustment value on the basis of a calculation duration measured between the sampling step and the end of the calculation of this adjustment value. This calculation duration enables the number of missing adjustment values to calculate to be known. To do this, said adjustment values are ordered in memory in accordance with the order of sampling of the source values of the counting device. In consequence, the adjustment values are not organized in accordance with the order of calculation, which may be different from the order of reading. In fact, when no incrementation of the counting device has taken place between at least two samplings, the calculation of a missing adjustment value necessitates an adjustment value calculated after having read the source value of the missing adjustment value. The order of calculation therefore differs in this case from the order of reading. Advantageously and according to one or more embodiments of the present disclosure, said adjustment value is represented by a decimal number, thus enabling a better precision to be obtained.

One or more embodiments of the present disclosure also extend to a data acquisition device for acquisition of data of a counting device operating at a frequency named operating frequency and measuring pulses delivered by a sensor, specially designed for the implementation of a process according to the present disclosure, including:

a sampling clock outputting pulses according to a sampling frequency, a read-input port that is suitable to be able to be connected to a data output of the counting device, a processing unit that is suitable to read a value of the read-input port, named source value, upon a pulse of the sampling clock, characterized in that said data acquisition device also includes:

a chronometer measuring a time-interval between a sampling of a source value and a change of value of a datum of the counting device, and in that the processing unit is also suitable to calculate a value, named adjustment value, at least on the basis of the measured time-interval and the source value of the counting device.

In particular, advantageously and according to the present disclosure, the operating frequency is independent of the sampling frequency. In consequence, the sampling frequency can be chosen independently of the operating frequency of the counting device while retaining the same precision in respect of the calculated results.

Advantageously and according to the present disclosure, the device includes several read-input ports that are suitable to be able to be connected to data outputs of measuring devices including sensors. In fact, when a mobile unit is subjected to a test, several measuring devices can output data to the input port of the acquisition device. These data can in consequence be acquired by the acquisition device.

Advantageously and according to the present disclosure, the measurement of the calculation duration also enables the set of the data acquired by the acquisition device to be synchronized. In fact, some acquired data, other than measurements of positioning and of speed, may necessitate less calculation before being transmitted. As their processing is then faster than the processing of the positioning data, advantageously and according to the present disclosure, the data acquisition device is able to assign a timestamp to an adjustment value equal to an instant of acquisition of the source value of the adjustment value. Then the adjustment value can be synchronized with the other data.

The present disclosure also extends to a process and a data acquisition device characterized in combination by all or some of the features mentioned above or below.

BRIEF DESCRIPTION OF THE DRAWINGS

Other objectives, characteristics and advantages of the present disclosure will become apparent from the following description which has been given by way of non-limiting example and which refers to the appended Figures in which.

DETAILED DESCRIPTION

Figure 1:
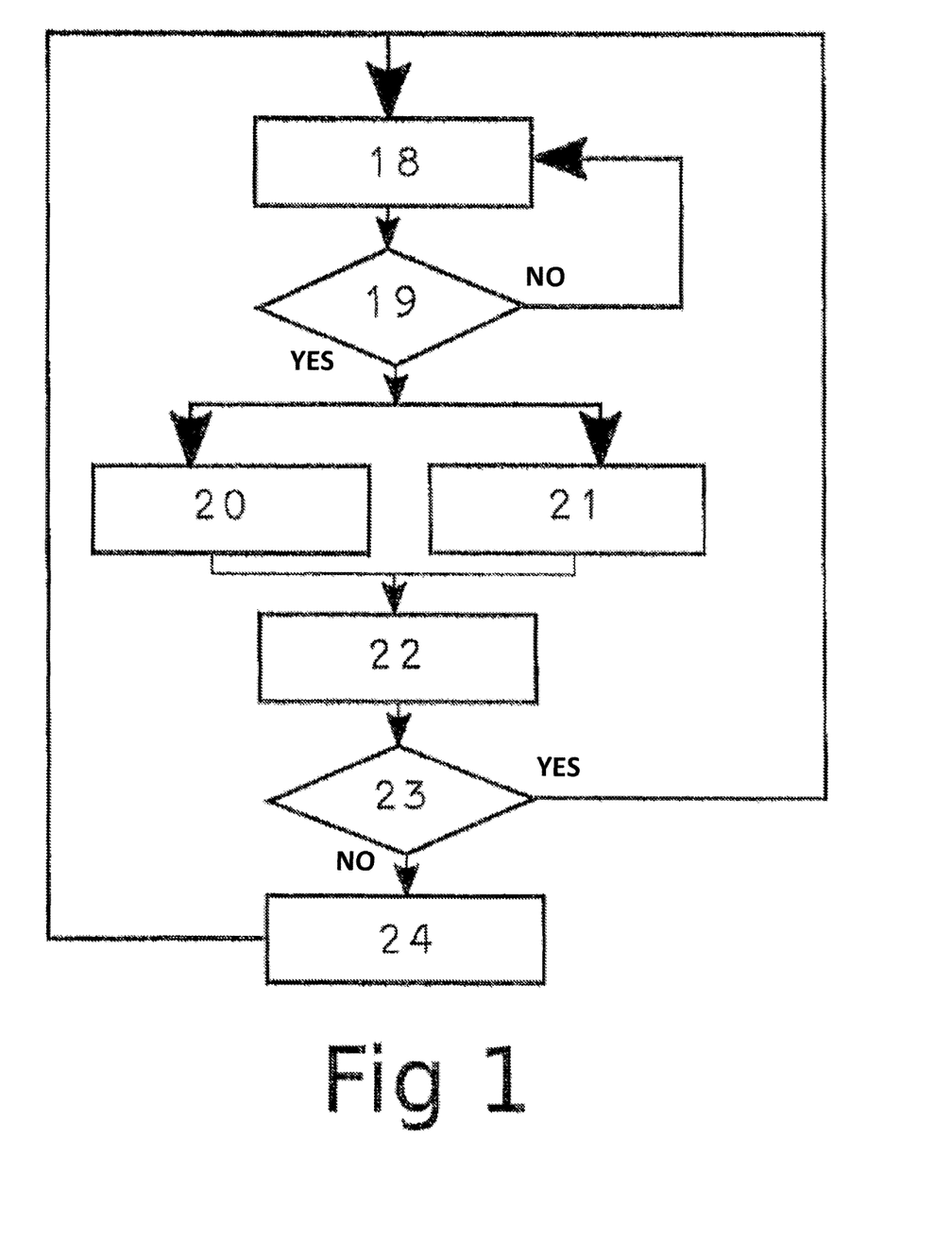
FIG. 1 is a sequential diagram of an exemplary operation for the acquisition and processing of the data.

An embodiment of the process according to the present disclosure, represented in FIG. 1, enables each source value of a counting device to be adjusted by a data acquisition device in order to obtain values that are representative of the positioning of a mobile unit associated with the sensor. The process includes a step 18 of sampling of a datum value C of the counting device, named current sampling $C'_x$, by the data acquisition device. The sampling is carried out in accordance with a sampling frequency corresponding to a sampling period. Then, a test 19 is carried out, in order to determine whether the value $C'_x$ is representative of an incrementation of the counting device—that is to say, if this value has not already been read or sampled previously. If the value $C'_x$ is not representative of an incrementation, the process is repeated, beginning by a sampling of a new source value in step 18.

It is noted that C is a count value wherein $C_y$ is the value held by the counting device at the index value y associated with the counting device and $C'_x$ is the value sampled and read by the data acquisition device at the index value x. The index value x corresponds to the rising edge of the step function of the exemplary sampling clock of the data acquisition device.

Datum value $C_y$ of the counting device present at index value x is recorded as $C'_x$ by the data acquisition device at a step 20 and an adjustment value is calculated if $C'_x$ is representative of an incrementation of the counting device ($C_x \neq C_{x-1}$). A step 21 of measurement of the time-interval $D_2$ between the sampling of the source value $C'_x$ sampled by the data acquisition device and the next incrementation of the counting device is also initiated after the test 19 initiated. Afterwards, in the course of a calculation step 22, an adjustment value $V_x$ is calculated on the basis of:

the source value $C'_x$, the measured time-interval $D_2$, a source value $C'_{x-1}$ obtained at the time of a preceding sampling, that is itself representative of a change of value of the counting device preceding the sampling of value $C'_x$, the time-interval $D_1$ between this preceding sampling and the change of value of the counting device that follows it, the period p between two samplings (the sampling frequency of the sampling clock of the data acquisition device).

The formula that is used takes the following form:

$$V_x = (C'_{x-1} + 1) + [C'_x - C'_{x-1}] \times \frac{(N \times p - D_1)}{N \times p - D_1 + D_2}$$

where:

N is the number of pulses emitted by the sensor (the number of physical events detected by the sensor) and therefore the number of changes of value of the counting device, occurring between the preceding sampling $C'_{x-1}$ and the current sampling $C'_x$, x is an index associated to the sampling of $C_x$ by the data acquisition device, This calculation is carried out when all the parameters necessary for the calculation have been acquired—that is to say, after the end of the step of measurement of the elapsed time-interval $D_2$.

A test 23 is carried out, in order to determine whether a value (such as $C'_x$), non-representative of an incrementation of the counting device, has been detected, at test 19, between the last two calculations of adjustment values of source values representative of an incrementation (such as $C'_{x-1}$ and $C'_{x+i}$). If a value $C'_x$, non-representative of an incrementation of the counting device, has not been detected, the process is repeated, beginning by a sampling of a new source value in step 18. Otherwise, if a value $C'_x$, non-representative of an incrementation of the counting device, has been detected, a step 24 has to be carried out.

A step 24 is therefore carried out to adjust the source value (such as $C'_x$) that is not representative of an incrementation of the counting device. In fact, the three steps 20, 21 and 22 only enable an adjustment value to be calculated for the sampling that follows an incrementation of the counting device in one or more exemplary embodiments of the present disclosure. Now, since the calculation of the adjustment value derived from the first sampling can only be carried out after a new incrementation of the counting device, and since a single calculation cannot be carried out at the same time, because a measurement of the time-interval and a calculation are only carried out after the end of the calculation of the preceding adjustment value, some source values retained by the data acquisition device are not adjusted, hereby named "missing adjustment values." The missing adjustment values can be viewed as not representative of an incrementation of the counting device. At least one missing adjustment value $V_x$ is then determined by linear interpolation of two adjacent, calculated adjustment values $V_{x-i}$ and $V_{x+M}$ resulting from the three steps 20, 21, 22. The adjustment values $V_{x-i}$ and $V_{x+M}$ are adjacent along the index x, separated along the index x by one or more missing adjustment values. $V_{x-i}$ is the calculated adjustment value immediately preceding the missing adjustment value $V_x$ of interest. $V_{x+M}$ is the calculated adjustment value immediately proceeding the missing adjustment value $V_x$ of interest. Each missing adjustment value $V_x$ can be calculated on the basis:

of the number M samplings of the counting device by the data acquisition device between the current index value x and the sampling of the calculated adjustment value $V_{x+M}$, of the number i of samplings of the counting device by the data acquisition device between the current index value x and the calculated adjustment value $V_{x-i}$, where:

x is an index associated to the sampling of the source value of $V_x$, the sampling frequency of the sampling clock.

The calculation of each adjustment value $V_i$ is realized in accordance with the formula:

$$V_x = V_{x-i} + (i) \times \frac{V_{x+M} - V_{x-i}}{M + i}$$

These adjustment values are then recorded. The process is then repeated, beginning by a sampling of a new source value in step 18.

This process enables, on the one hand, the lack of precision of the counting device, resulting from the temporal discretisation, to be rectified, but also enables the sampling to be made asynchronous in relation to the operating frequency of the counting device.

Since the calculated and determined adjustment values can be represented by a decimal number, this process enables results to be obtained that are representative of the positioning of the mobile unit on the basis of a sampling frequency lower than the operating frequency of the counting device. In consequence, this brings about a higher precision, CPU gains and a lowering of the volume, and therefore of the cost of storage, of the data.

In one or more operating environments for embodiments of the present disclosure, the output information desired can be a frequency associated with the mobile unit. It is noted that in one or more other operating environments, an embodiment of the present disclosure may not be outputting a value of frequency. The present disclosure is not limited to embodiments and/or operating environments in which a value for frequency is an output. In order to know the speed of the mobile unit, for example its angular velocity in the case of a rotary encoder, it is necessary to know the frequency of the events occurring at the sensor—that is to say, the frequency of the pulses of the train of pulses. This frequency F can be calculated in accordance with the following formula:

$$F = T1/T2$$

where:

$$T1 = (C'_x - C'_{x-n}) \cdot p \cdot sr, \text{ and}$$

$$T2 = (N \cdot p) - D_1 + D_2,$$

where:

$C'_x$ is the current source value, $C'_{x-n}$ is a prior source value sampled n sampling periods before the current index value x, sr is the sampling frequency of the data acquisition device, N is the number of changes of value of the counting device between $C'_{x-n}$ and $C'_x$, T1 represents the number of incrementations of the counting device during a sampling period, T2 represents the number of incrementations of the counting device between the end of the measurement of $D_1$ and the end of the measurement of $D_2$.

For each adjustment value calculation, a step of synchronization of the adjustment value in relation to its source value is carried out on the basis of a measured calculation duration representing the duration necessary for the calculation of the adjustment value, and therefore, in part, on the basis of the duration necessary to know all the parameters of the calculations. For example, the calculation of an adjustment value in the course of steps 20, 21, 22 necessitates the acquisition of time-interval $D_2$. This calculation therefore involves a delay between the sampling of the source value of the counting device and its associated adjustment value.

The calculation duration also enables the adjustment values to be reordered in relation to the order of their source values. In fact, the order of calculation of the adjustment values is not necessarily the order of acquisition of the source values. For example, a missing adjustment value is calculated after the calculation of the adjustment value that follows the incrementation of the counting device following the sampling of the source value of this missing adjustment value. Now, the acquisition of the source value of the missing adjustment value precedes that of the source value of the adjustment value that follows.

A data acquisition device 25 designed for the implementation of a process for acquisition of data of a counting device as described above is represented in FIG. 2. The data acquisition device 25 has one read-input port that is suitable to be able to be connected to a data output of the counting device 27 measuring pulses delivered by a sensor 26 cooperating with a mobile unit 43 to obtain information on the mobile unit 43 such as the position of the mobile unit 43 and/or its speed and/or its acceleration. The counting device 27 is able to increment a value for each change of state of the sensor 26.

Figure 2:
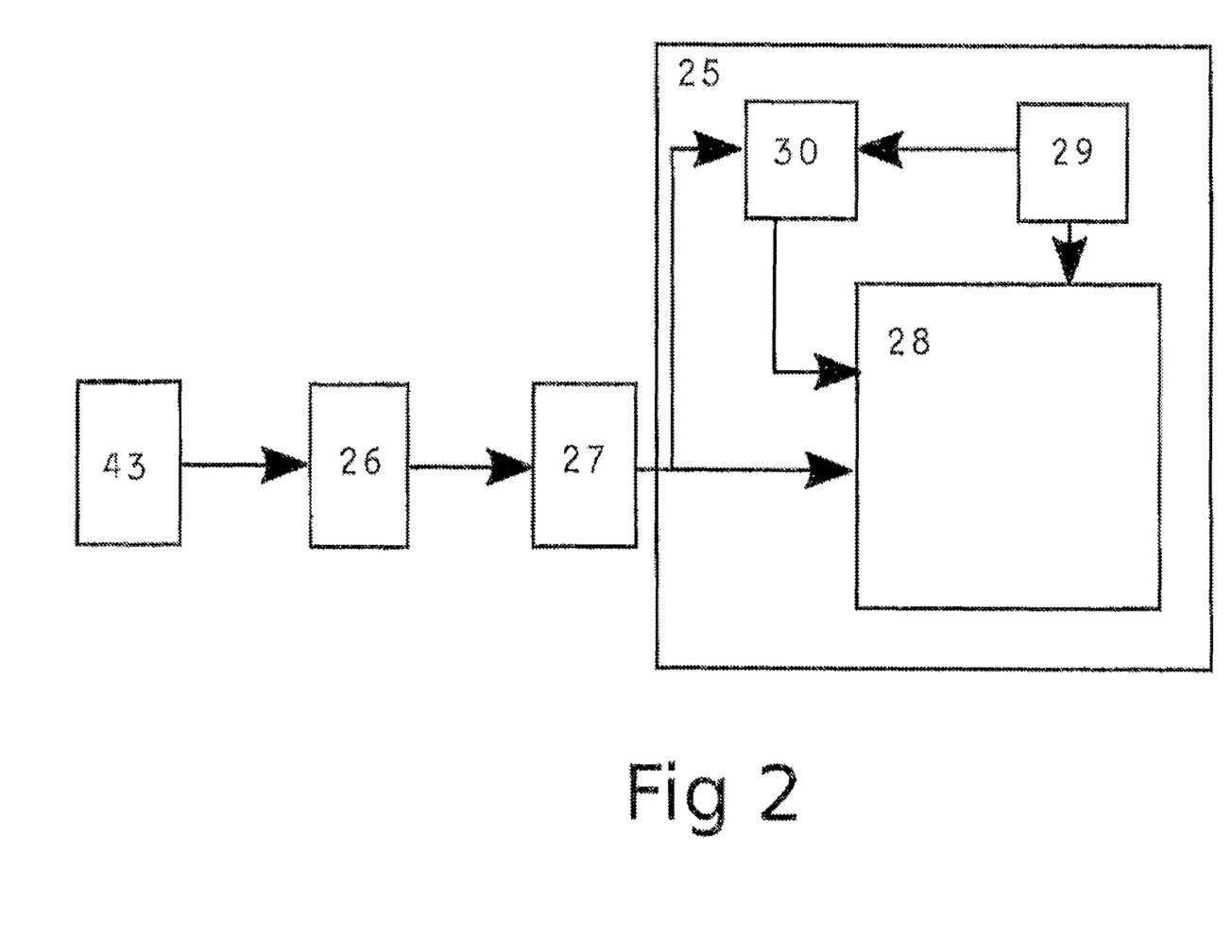
FIG. 2 is a diagram illustrating the interactions between the various elements of an exemplary data acquisition device enabling the various steps to be realized, according to an embodiment of this device.

Such a data acquisition device 25 includes a processing unit 28, a sampling clock 29 and a chronometer 30. The processing unit 28 enables the values of the counting device to be read at each rising edge of pulses that are output by the sampling clock 29 according to the sampling frequency, and enables the adjustment values to be calculated. The processing unit 28 also enables the adjustment values to be synchronized. This processing unit 28 includes, in particular, an arithmetic logic unit enabling the calculations to be carried out, and a memory in which the source values and the results of the calculations are recorded. The chronometer 30 operating at a frequency preferably higher than 10 MHz, for example of the order of 100 MHz, enables the time-interval between a rising edge of the sampling clock 29 and the first incrementation of the counting device 27 that follows it to be measured. The calculation duration is measured by the processing unit, by counting the number of pulses of the sampling clock 29.

It is noted that in one or more embodiments of the present disclosure, the sampling clock 29 and the chronometer 30 can be embodied in a XILINX®, Spartan-6 FPGA. It is noted that in one or more other embodiments of the present disclosure, the sampling clock 29 and the chronometer 30 can be embodied in one or more other devices. The present disclosure is not limited to embodiments incorporating a XILINX®, Spartan-6 FPGA. In one or more embodiments of the present disclosure, the processing unit 28 can be embodied in an Intel® i7 processor. It is noted that in one or more other embodiments of the present disclosure, the processing unit 28 can be embodied in another device. The present disclosure is not limited to embodiments incorporating an Intel® i7.

In some embodiments, the counting device can be included in the data acquisition device or assembled to the sensor.

In one embodiment, when a mobile unit 43 is subjected to a test, the processing unit can also acquire other data, named subsidiary data, stemming from other sensors or from other counting devices. In this case the measurement of the calculation duration enables these subsidiary data to be synchronized with the adjustment values. Indeed, the acquisition of these subsidiary data may be faster than the time for calculation of the adjustment values. Now, it may be necessary to synchronize each subsidiary datum with the adjustment value of a source value acquired at the same instant, in order to link them. The data acquisition device is able to assign a timestamp to an adjustment value equal to an instant of acquisition of the source value of the adjustment value. Then the adjustment value can be synchronized with the other data.

Figure 3:
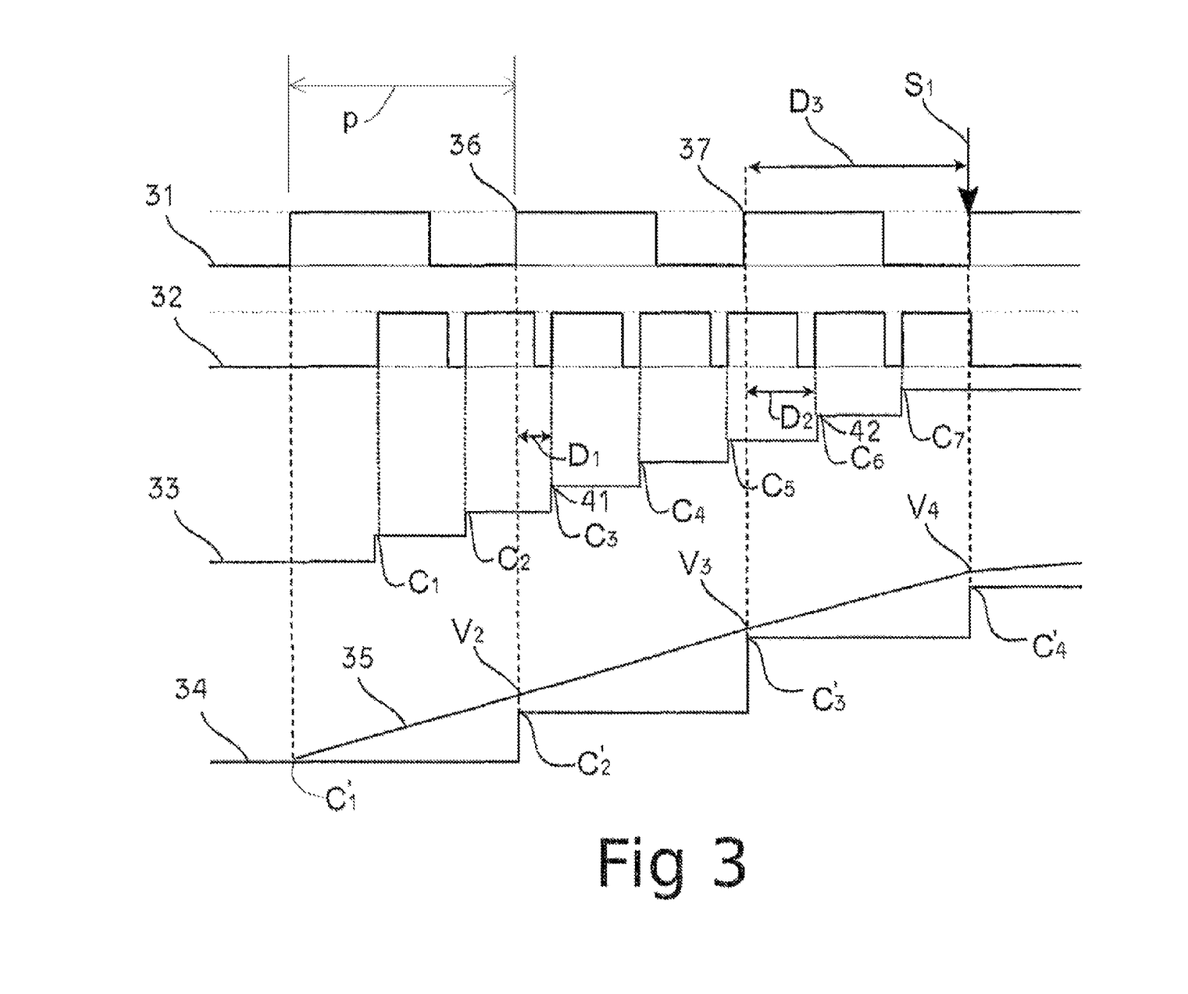
FIG. 3 is a timing diagram illustrating a first example of acquisition and processing of the acquired data.
Figure 4:
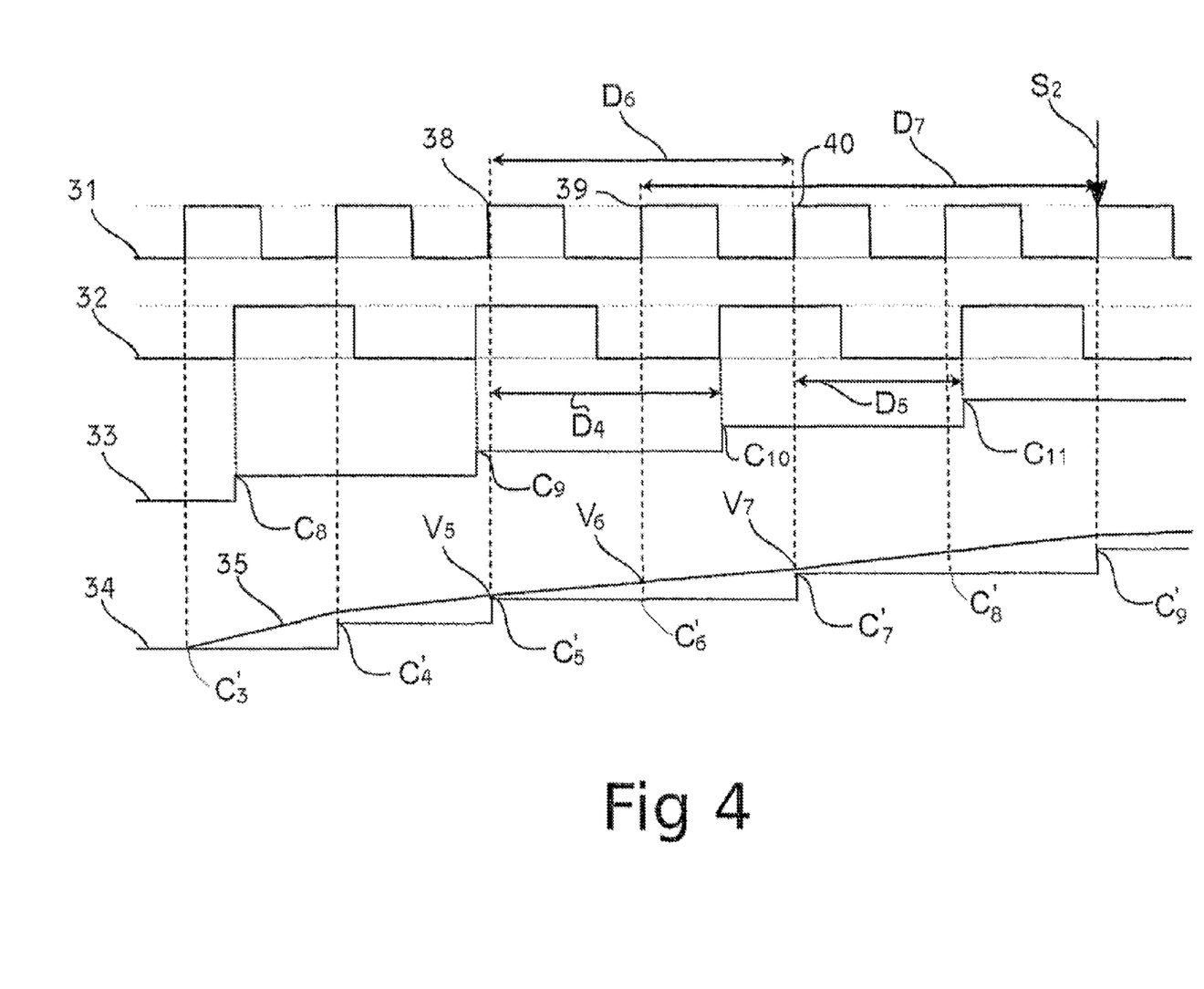
FIG. 4 is a timing diagram illustrating a second example of acquisition and processing of the acquired data.

Two examples of acquisition and processing of data of a counting device according to the present disclosure are represented in FIGS. 3 and 4 by timing diagrams. In these two examples:

curve 31 represents the pulses of the sampling clock 29, exhibiting rising edges—rising edges 36, 37 in FIG. 3, and 38, 39 and 40 in FIG. 4—and falling edges, curve 32 represents the pulses that are output by the sensor 26 corresponding to the changes of state of the sensor 26, curve 33 represents the counting device 27 incrementing with each pulse which is output by the sensor 26 (each exemplary C value along curve 33 has a value of 1 greater than the preceding value in the exemplary embodiment), curve 34 represents a sampling process by the data acquisition device 25 without adjustment, the source values $C'_x$. In such a process, the processing unit 28 will simply read the value of the counting device 27 at each rising edge of the sampling clock 29 and will record it without complementary processing, curve 35 represents the adjustment values derived from the acquisition and processing of the source values realized by a device according to one or more embodiments of the present disclosure.

It is noted that the points designated with "V" on curve 35 represent values that will be read by a user, or "output" values. It is further noted that the points designated with "C" on curve 33 represent values generated internally and not necessarily output.

The first example, represented in FIG. 3, corresponds to an acquisition in the course of which the counting device 27 increments more than once during a sampling period—that is to say, three times between a rising edge 36 and a rising edge 37 of the sampling clock 29. In this example, the aim is to calculate adjustment value V3, the source value of which is C'3. The first rising edge of the sampling clock 29 that follows an incrementation of the counting device and precedes index value 3 is rising edge 36. Rising edge 36 comes into being after the counting device 27 takes value C2. The processing unit 28 then records the value C'2, and the chronometer 30 begins to measure the elapsed time-interval D1 until the next incrementation 41 of the counting device 27 is that taking value C3. It is noted that C2 and C'2 are equal to one another and are equal to "2." The rising edge of the sampling clock 29 that follows another incrementation of the counting device 27 is rising edge 37. The processing unit 28 then samples value C5 along curve 33 of the counting device 27 as C'3 and the chronometer 30 begins to measure the elapsed time-interval D2 until the next incrementation 42 of the counting device 27, that being C6. It is noted that C5 and C'3 are equal to one another and are equal to "5." C5 is an exemplary first datum value, C6 is an exemplary second datum value and is a proceeding and upward incremental change relative to the first datum value C5, and C3 is an exemplary third datum value and a preceding and downward incremental change relative to the first datum value C5. The processing unit 28 then calculates said adjustment value V3 as a function of the elapsed time-intervals D1 and D2 and of values C2 and C5 in accordance with the formula:

$$V_3 = (C'_2 + 1) + [C'_3 - C'_2] \times \frac{(3p - D_1)}{3p - D_1 + D_2}$$

where p is constant and equal to the period of the sampling clock. N=3 as FIG. 3 shows three physical events detected by the sensor 26 between index values 2 and 3 of the sampling clock 29. The calculation is carried out at instant $S_1$ when all the parameters necessary for the calculation of $V_3$ have been acquired. Adjustment value $V_3$ is then stored in memory. In parallel, the processing unit 28 counts the number of periods between the sampling of $C_5$ and instant $S_1$, in order to measure the calculation time-interval $D_3$, afterwards enabling the adjustment values to be synchronized with the subsidiary data that may be acquired.

The second example, represented in FIG. 4, corresponds to an acquisition in the course of which the counting device increments after a duration longer than a sampling period. Two adjustment values $V_5$ and $V_7$ have already been previously calculated and allocated respectively to rising edges 38 and 40 in the same way as for the first example, by measuring the elapsed time-intervals $D_4$ and $D_5$. However, time-interval $D_6$ for calculation of $V_6$ is longer than a sampling period p. As a consequence, no calculated adjustment value $V_6$ is yet allocated to rising edge 39. This missing adjustment value $V_6$ will then be calculated by the processing unit 28 by using said adjustment values $V_5$ and $V_7$ in order to apply a linear interpolation to obtain said missing adjustment value $V_6$ in accordance with the following formula:

$$V_6 = V_5 + (1) \times \frac{V_7 - V_5}{2}$$

In the exemplary application of the general equation, i is equal to one since the immediately preceding adjustment value was calculated and not determined by interpolation. M is also equal to one since the immediately proceeding adjustment value was calculated and not determined by interpolation. The calculation is carried out at instant $S_2$ when all the parameters necessary for the calculation of $V_6$ have been acquired. Adjustment value $V_6$ is then stored. In parallel, the processing unit 28 counts the number of periods between the sampling of $C_9$ and instant $S_2$, in order to measure the calculation time-interval $D_7$ enabling the missing adjustment value $V_6$ to be reordered afterwards in accordance with the order of acquisition of the source values of adjustment values $V_5$, $V_6$ and $V_7$ and enabling the adjustment values to be synchronized with the subsidiary data that may be acquired.

Figure 5:
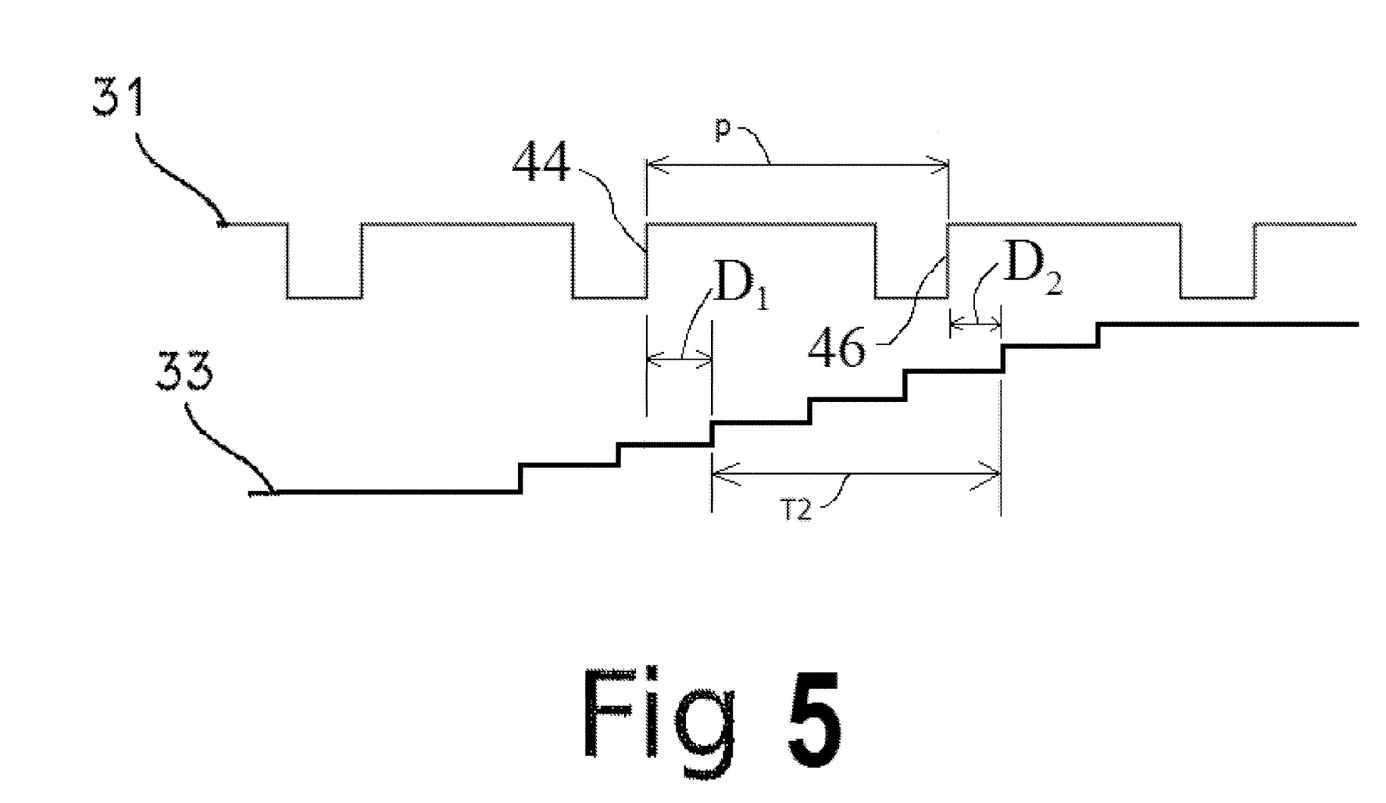
FIG. 5 is a graph to illustrate frequency calculation.

FIG. 5 is a graph to illustrate frequency calculation. It is again noted that the present disclosure is not limited to embodiments and/or operating environments in which frequency is calculated. Curve 31 represents the pulses of the sampling clock 29. For example, assume that rising edge 44 corresponds to index value x=3 and that rising edge 46 corresponds to index value x=4. Curve 33 represents the counting device 27 incrementing with each pulse which is output by the sensor 26. The frequency of the mobile unit 43 at index value x=3, is found by:

$$F_3 = T1/T2$$

where:

$$T1 = (C'_4 - C'_3) \cdot p \cdot sr, \text{ and}$$

$$T2 = (N \cdot p) - D_1 + D_2,$$

where:

$C'_4$ is the current source value and equals 5, n=1 since the source values are immediately adjacent to one another along the index, $C'_3$ is a prior source value sampled n sampling periods before the current index value x and equals 2, sr is the sampling frequency of the data acquisition device, N is the number of changes of value of the counting device between $C'_3$ and $C'_4$ and equals 3, T1 corresponds to number of incrementations of the counting device during a sampling period, T2 corresponds to the number of incrementations of the counting device between the end of the measurement of $D_1$ and the end of the measurement of $D_2$.

One or more embodiments of the present disclosure may form the subject of numerous embodiment variants in comparison with the embodiment described above. In particular, in the embodiment described previously the values of the counting device are read at rising edges of the sampling clock. However, there is nothing to prevent this sampling from being carried out at the falling edges of the sampling clock. Likewise, a value of the counting device may be read at each rising edge and falling edge, in order to increase the precision of the acquisition.

The device may possess several counting devices and several chronometers.

One application of such a process consists in measuring the positioning and/or speed and/or acceleration of an object. For example, such a process may be applied in order to measure the speed of rotation of a motor, or that of the wheels of a robot, or in order to measure the speed of displacement of an elevator. The process may also be applied for harmonic tracking where phase and frequency are needed and also in order to measure torsional vibration of a shaft.

What is claimed is:

1. A process for the acquisition of data of a counting device measuring pulses delivered by a sensor associated with a mobile unit comprising:
    reading a first datum value from a data output of the counting device through a read-input port of a data acquisition device, wherein the first datum value corresponds to a first number of digital pulses emitted by the sensor and corresponds to a sensed position of the mobile unit;
    storing a second datum value with the counting device, wherein the second datum value corresponds to a second number of digital pulses emitted by the sensor, and wherein the second datum value is greater than the first datum value;
    storing a third datum value with the counting device, wherein the third datum value corresponds to a third number of digital pulses emitted by the sensor, and wherein the third datum value is less than the first datum value;
    storing in memory of the data acquisition device the first datum value as a first source value;
    measuring, with a chronometer of the data acquisition device, a first time interval between said reading the first datum value from the data output through the read-input port and said storing the second datum value with the counting device;
    obtaining, with the data acquisition device, a first adjustment value $V_x$ based on the first source value stored in the memory of the data acquisition device adjusted in response to the measured first time interval; and
    outputting, from the data acquisition device, the first adjustment value $V_x$ as representative of a position of the mobile unit rather than the first source value.

2. The process of claim 1 wherein said obtaining is further defined as:

$$V_x = (C'_{x-1} + 1) + [C'_x - C'_{x-1}] \times \frac{(N \times p - D_1)}{N \times p - D_1 + D_2}$$

where:
- x is a current index value,
- $V_x$ is the adjustment value at the current index value,
- $C'_x$ is the first datum value of the counting device and is sampled at the current index value,
- $D_2$ is the first time interval lasting between the sampling of $C'_x$ and the first incremental change of the counting device to the second datum value,
- $C'_{x-1}$ is the third datum value of the counting device at a first index value that precedes the current index value x and is also itself representative of a change of increment of the counting device,
- $D_1$ is a second time interval lasting between the sampling of $C'_{x-1}$ and a next change of increment of the counting device,
- p is a period between two consecutive samplings of the counting device, and
- N is a number of changes increment of the counting device between $C'_{x-1}$ and $C'_x$.

3. The process of claim 2 wherein said obtaining is further defined as obtaining first and second adjustment values $V_{x-i}$ and $V_{x+M}$ each at a different index values from the current index value.

4. The process of claim 3 wherein said obtaining is further defined as obtaining a third adjustment value by linear interpolation of the first and second adjustment values $V_{x-i}$ and $V_{x+M}$.

5. The process of claim 1 further comprising:
obtaining a frequency of increments of the counting device.

6. The process of claim 1 wherein said obtaining is further defined as:
obtaining the first adjustment value $V_x$ as a decimal number.

7. A data acquisition device for acquisition of data from a counting device operating at a first frequency and measuring pulses delivered by a sensor associated with a mobile unit and comprising:
a sampling clock outputting pulses according to a second frequency;
at least one read-input port configured to connect to a data output of the counting device;
a processing unit configured to repeatedly sample a datum value stored by the counting device through said at least one read-input port and store in memory each of the sampled datum value as a source value at each pulse of said sampling clock, wherein each stored source value corresponds to a sensed position of the mobile unit;
a chronometer measuring a time-interval between a sampling of a first datum value by said processing unit and a change of the first datum value stored by the counting device to a second datum value stored at the counting device; and
wherein said processing unit is also configured to calculate an adjustment value based on the first source value adjusted at least partially in response to the measured time-interval, and said processing unit also configured to output the adjustment value as a position of the mobile unit instead of the stored first source value.

8. The data acquisition device of claim 7 wherein the first frequency of the counting device is independent of said second frequency of said sampling clock.

9. The data acquisition device of claim 8 wherein said processing device is further defined as configured to assign a timestamp to the adjustment value equal to an instant of acquisition of the source value associated with the adjustment value.

10. The process of claim 1 further comprising:
allocating the adjustment value to an instant of sampling of the counting device on the basis of a measured calculation time interval between the sampling and the end of the calculation of the adjustment value.

* * * * *